(12) United States Patent
Sparling (10) Patent No.: US 6,445,285 B1
(45) Date of Patent: *Sep. 3, 2002

(54) METHOD AND APPARATUS FOR DETECTING OBJECTS

(75) Inventor: Larry A. Sparling, Mundelein, IL (US)

(73) Assignee: Motorola, Inc., Schaumburg, IL (US)

( * ) Notice: Subject to any disclaimer, the term of this patent is extended or adjusted under 35 U.S.C. 154(b) by 174 days.

This patent is subject to a terminal disclaimer.

(21) Appl. No.: 09/588,733

(22) Filed: Jun. 7, 2000

Related U.S. Application Data (63) Continuation of application No. 09/457,408, filed on Dec. 7, 1999.

(51) Int. Cl.[7] .................................................. B60Q 1/00
(52) U.S. Cl. ....................... 340/436; 340/435; 340/437; 340/903
(58) Field of Search ................................. 340/436, 435, 340/437, 438, 904, 903, 943; 367/909

(56) References Cited

U.S. PATENT DOCUMENTS

| | | | | |
|---|---|---|---|---|
| 4,015,232 A | * | 3/1977 | Sindle | 340/1 |
| 4,490,716 A | * | 12/1984 | Tsuda et al. | 340/904 |
| 4,500,977 A | * | 2/1985 | Belhard | 367/108 |
| 5,173,881 A | * | 12/1992 | Sindle | 367/101 |
| 5,574,426 A | * | 11/1996 | Shisgal et al. | 340/435 |
| 5,689,250 A | * | 11/1997 | Kremser | 340/904 |
| 5,754,123 A | * | 5/1998 | Nashif et al. | 340/903 |
| 5,872,507 A | * | 2/1999 | Weber et al. | 340/435 |
| 5,914,652 A | * | 6/1999 | Adamo | 340/436 |
| 6,021,373 A | * | 2/2000 | Zuercher et al. | 701/300 |
| 6,133,826 A | * | 10/2000 | Sparling | 340/436 |
| 6,215,415 B1 | * | 4/2002 | Schroder | 340/932.2 |

* cited by examiner

*Primary Examiner*—Jeffery Hofsass
*Assistant Examiner*—Son Tang
(74) *Attorney, Agent, or Firm*—Simon B. Anolick; Thomas V. Miller (57) ABSTRACT

An apparatus and method for the detection of objects that lie within the path of a motor vehicle includes ultrasonic sensors (20) fitted to either a front or rear surface (14, 18) of the motor vehicle (10). The ultrasonic sensors (20) are adapted to both emit ultrasonic energy and to detect ultrasonic energy. A detection field (32) is divided into a plurality of sub-fields (42–50) and each is illuminated using a different amount of sensing energy in order to detect objects therein.

18 Claims, 6 Drawing Sheets

METHOD AND APPARATUS FOR DETECTING OBJECTS

This is a continuation application of Ser. No. 09/457,408, currently pending filed Dec. 7, 1999.

FIELD OF THE INVENTION

The invention relates generally to object detection, and more particularly, to an apparatus and method for detecting objects in the path of a motor vehicle.

BACKGROUND OF THE INVENTION

When operating a motor vehicle, such as an automobile, light-duty truck, heavy duty truck, tractor-trailer, and the like, it may not be possible to visually detect objects that lie within the path of the motor vehicle. This is particularly true when backing the motor-vehicle because blind spots and/or non-optimal lines of sight may dictate reliance on mirrors to view the path into which the motor vehicle is being moved. However, backing is not the only time when an object may not be within the view of the operator. Objects, and particularly objects very near either the front or rear of the vehicle, may be difficult to visually detect from the normal operating position of the motor vehicle.

To aid motor vehicle operators in detecting objects that may lie in the path of the motor vehicle, object detection systems have been proposed and implemented on some motor vehicles. These object detection systems, typically using ultra-sonic energy, include one or more sensors fitted to a bumper of the motor vehicle. Each sensor includes a transmitter capable of illuminating a field in which the objects are to be detected with an energy emission. The sensor also includes a receiver that listens for an energy return. If an object is located within the field, a portion of the energy emission will be reflected from the object and detected by the receiver. In this event, the system will typically also include an alert, audio or visual or both, to alert the vehicle operator as to the presence of the object within the field.

The above systems are generally intended to operate while the motor vehicle is moving. To provide as much reaction time as possible to the operator, it is desirable to detect an object coming within the path of the motor vehicle at as great a distance from the vehicle as possible. At the same time, it is possible an object may come into the path of the vehicle at a position that is closely adjacent to the vehicle. These objects must also be detected. Detection of objects located far from the vehicle will typically require use of more sensing energy than the detection of objects that are located near to the vehicle. However, at energy levels that are high enough to detect a remote object, significant noise can appear that may interfere with detection of near objects or even with detection of the remote object. Noise can be the result of the sensing energy deflecting from the ground, from laterally located objects not in the vehicle path or from multipath sources. Noise may also be introduced from external sources. The noise can cause return signals that are wrongly interpreted as objects or may mask the energy returns of actual objects.

Some detection systems, such as those that utilize ultrasonic energy as the sensing energy, may use one or more transceivers that both generate the sensing energy and detect energy returns from the detection field. Such devices advantageously utilize the same transducer element as a transmitter and as a receiver and are thus low cost. Transceiver based systems can suffer from poor object detection; particularly when the object is near to the vehicle. Once the transceiver is energized to send sensing energy into the detection field, there is a period that extends longer than the actual time the transceiver is energized during which it is not capable of detecting energy returns. The transducer element within the transceiver continues to oscillate "ring" during this period much like a bell rings after being struck. This period is referred to as the "ringout" period. An object may be close enough to the transceiver that energy returns from the object may fall within the ringout period and may thus be undetectable.

Thus, there is a need for an improved object detection system that is robust in both near object and far object detection.

DETAILED DESCRIPTION OF THE PREFERRED EMBODIMENTS

The invention is described in terms of several preferred embodiments of apparatus and methods for the detection of objects that lie within the path of a motor vehicle. In accordance with the preferred embodiments, ultrasonic sensors are fitted to either a front or rear surface of the motor vehicle. The ultrasonic sensors are adapted to both emit ultrasonic energy and to detect ultrasonic energy. The sensors are coupled to a processor that directs the operation of the sensors for the detection of objects within the path of the motor vehicle. The following description of the preferred embodiments is exemplary of the many aspects and features of the invention and in no way should be taken as limiting of the broad scope of the invention.

Figure 1:
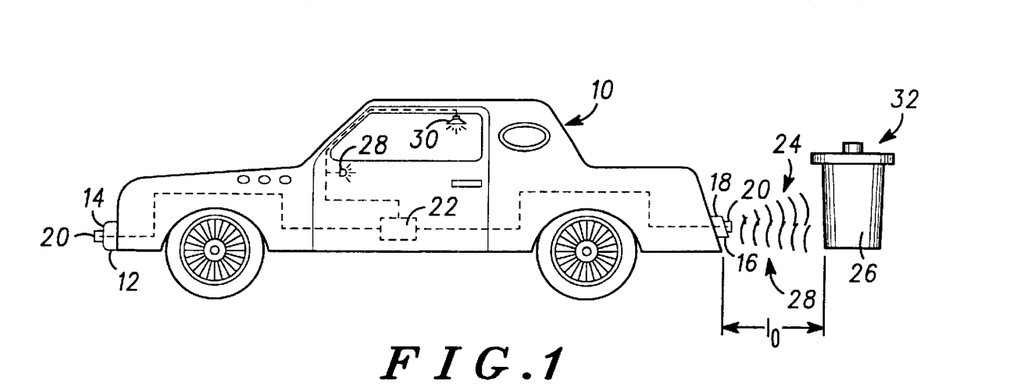
FIG. 1 is a schematic illustration of an object detection system in accordance with a preferred embodiment of the invention fitted to a motor vehicle.
Figure 2:
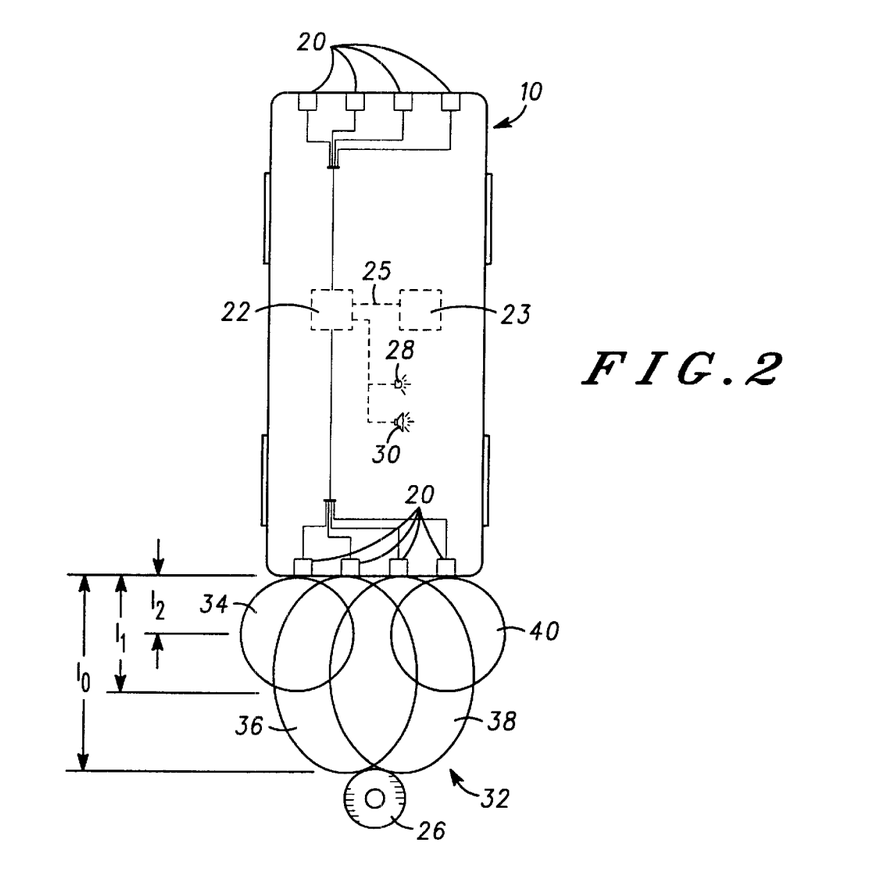
FIG. 2 is a further schematic illustration of the object detection system shown in FIG. 1, which also illustrates a detection field.

With reference to FIG. 1 and FIG. 2, a motor vehicle 10 has a front bumper 12 with a front surface 14 and a rear bumper 16 with a rear bumper surface 18. Each of the front bumper 12 and the rear bumper 16 is fitted with a plurality of ultrasonic sensors 20, e.g., four sensors 20 are shown fitted to each bumper 12 and 16, respectively. The sensors 20 are coupled by suitable wiring connections to a processor 22. The processor 22 may include a general purpose microprocessor or may include a dedicated processor or application specific integrated circuit (ASIC). The processor 22 will also include memory, which may hold program instructions directing its operation, and suitable input/output interfaces. The processor 22 may also include an interface to the vehicle electronics system, and still further, the processor 22 may be integrated directly into the vehicle electronics system, e.g., within the vehicle body computer 23. In such an arrangement, the sensors 20 may receive control signals via an in-vehicle communication bus 25 and provide data back to the body computer 23 via the communication bus.

Each sensor 20 is preferably a sensor module including a transducer element and associated driver/receiver circuitry, and suitable modules are commercially available from Motorola, Inc., Schaumburg, Illinois. Still referring to FIG. 1, the sensors 20 provide a sensing energy output 24 to "illuminate" the detection field 32. Upon encountering an object 26 within the detection field 32, a portion of the output 24 is reflected from the object 26 generating an energy return 28 that is directed back toward the sensors 20. The sensors 20 detect the energy return 28, and using well known time and speed relationships, the processor 22 can calculate the distance "$I_0$" of the object from the vehicle 10, e.g., in the example shown, the distance from the surface 18 of the rear bumper 16 to the object 26.

The processor 22 may be coupled to one or more alert devices installed within the vehicle 10. As shown in FIG. 1 and FIG. 2, the processor 22 is coupled to a light 28 and to a speaker 30. Based upon the distance of the object from the vehicle 10, several levels of alerts may be generated. For example, if the object 26 is located, as shown, a distance "$I_0$" from the rear bumper 16, a slow audio beep may be generated. As the object 26 becomes nearer to the vehicle 10, for example as the vehicle backs up, at a distance "$I_1$" the rate of the audio beep may increase. Finally, at a distance "$I_2$" of the object from the vehicle, the audio beep may become a continuous audio tone. Similarly, the light 28 may be caused to flash, first slowly, and then with increasing frequency until becoming steadily illuminated. As the operator may be backing the vehicle 10, and hence using the vehicle's mirrors, it may be possible to incorporate the light 28 into the mirrors to ensure it is within the operator's field of view.

Referring more particularly now to FIG. 2, within the overall detection field 32, particular sensors 20 may be adapted to illuminate portions, 34, 36, 38 and 40, respectively, of the detection field 32. In this regard, the sensors 20 at the corners of the vehicle 10 may view portions 34 and 40 of the field 32 near to and extending laterally of the sides of the vehicle 10. The sensors 20 disposed more toward the center of vehicle 10 may view portions 36 and 38 of the field 32 that extend farther longitudinally from the surface 18.

Figure 3:
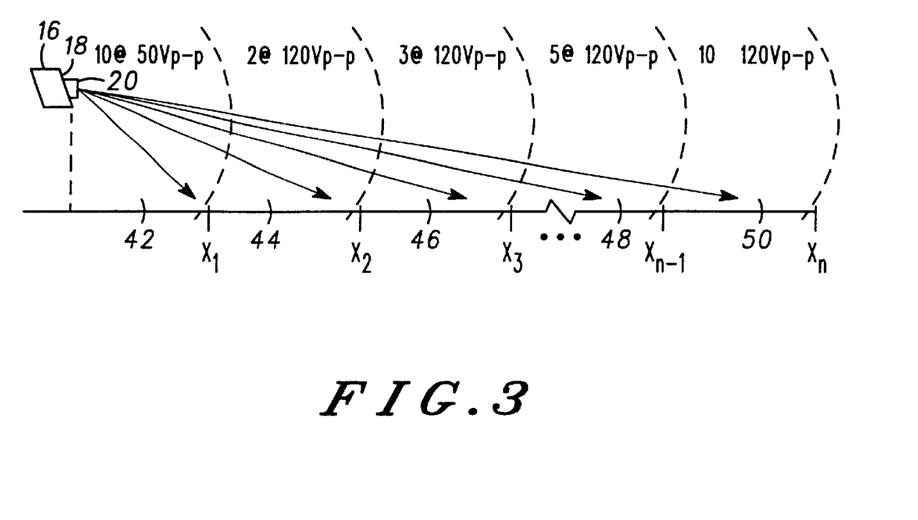
FIG. 3 is a diagram illustrating the detection field divided into a plurality of sub-fields in accordance with a preferred embodiment of the invention.

Turning now to FIG. 3, in accordance with a preferred embodiment of the invention, for each sensor 20 the respective portion, 34–40, is further divided into sub-fields extending longitudinally from the vehicle 10. A first sub-field 42 is disposed adjacent to the surface 18 and extends from the surface 18 a distance $X_1$. A second sub-field 44 extends a distance $X_2$, a third sub-field 46 extends a distance $X_3$, and so on until a last sub-field 50 extends a distance $X_n$ from the vehicle 10.

Partitioning of the detection field 32 longitudinally permits the energy used to detect objects in each sub-field 42–50 to be optimized for the distance that the sub-field is located from the sensor 20. The amount of energy emitted by the sensor 20 is related to several factors including the number and duty cycle of the energy pulses, or pings, and the amplitude of the pings that form the output 24 waveform. By varying one or more of these factors, the energy emitted from a sensor 20 may be controlled, and in accordance with a preferred embodiment of the invention, may be optimized for each particular sub-field 42–50. There are several other considerations in the optimization of the energy for each of the sub-fields 42–50. For example, the ground must be considered, because an excessive energy emission will illuminate the ground and result in detection of the ground. Too little energy may cause blind spots leaving objects within the detection field 32 undetected. Illustrated in FIG. 3 are exemplary energy values, not intended to be limiting of the invention, defined by the number of pings of a given amplitude to illuminate the respective sub-fields.

Figure 4:
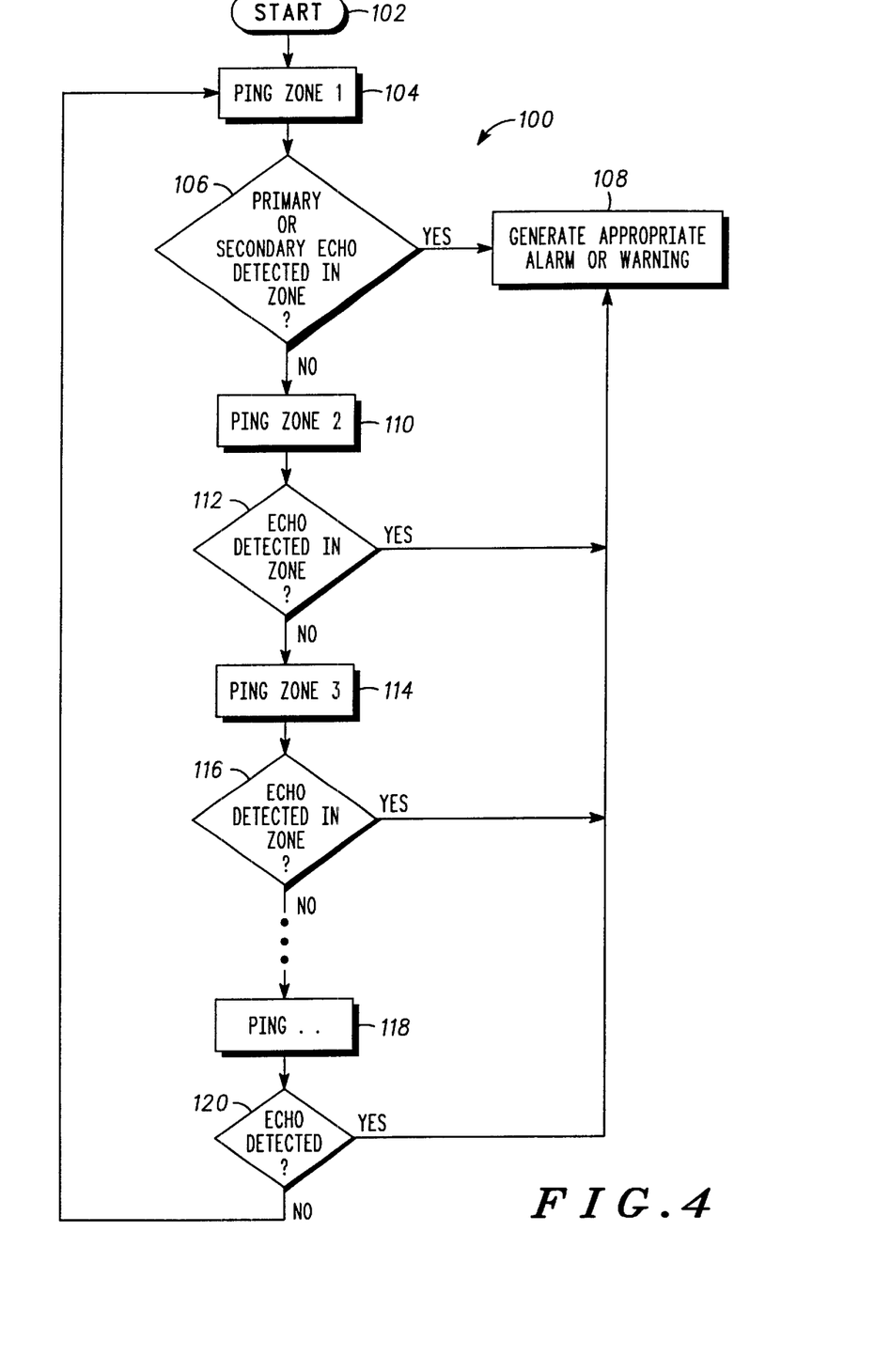
FIG. 4 is a flowchart illustrating a method of object detection in accordance with a preferred embodiment of the invention.
Figure 5:
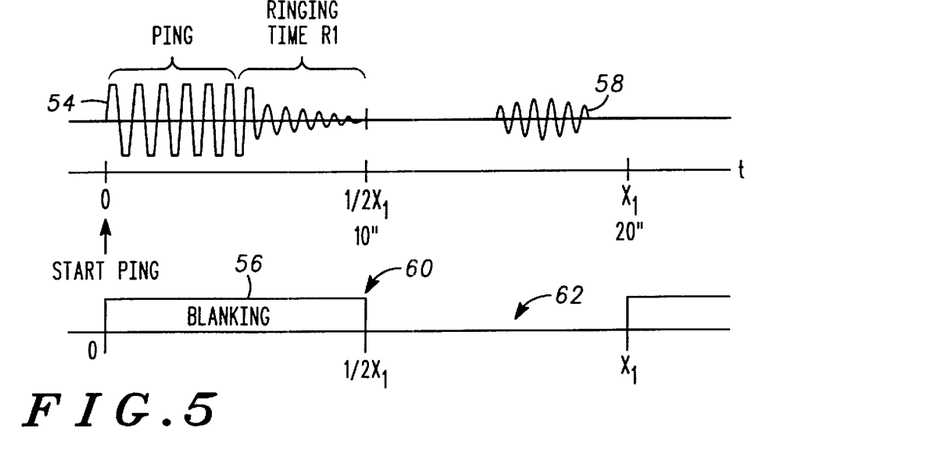
FIG. 5 is a waveform diagram illustrating object detection in accordance with a preferred embodiment of the present invention.
Figure 6:
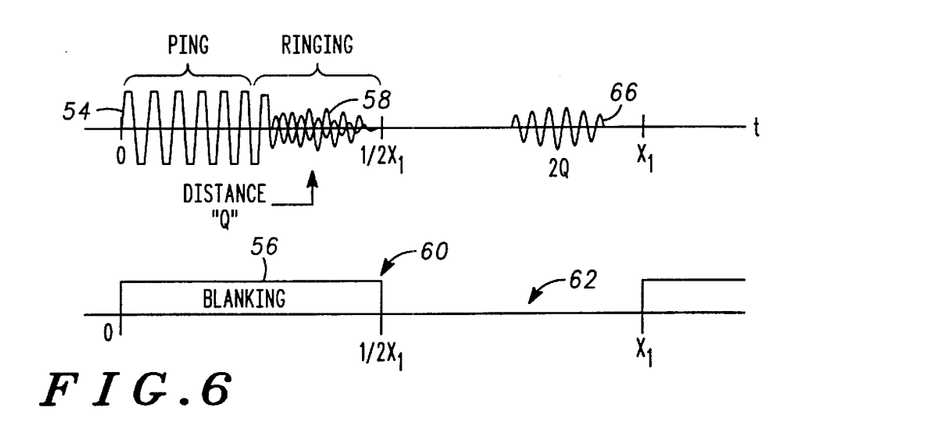
FIG. 6 is a waveform diagram illustrating object detection in accordance with a preferred embodiment of the present invention.
Figure 7:
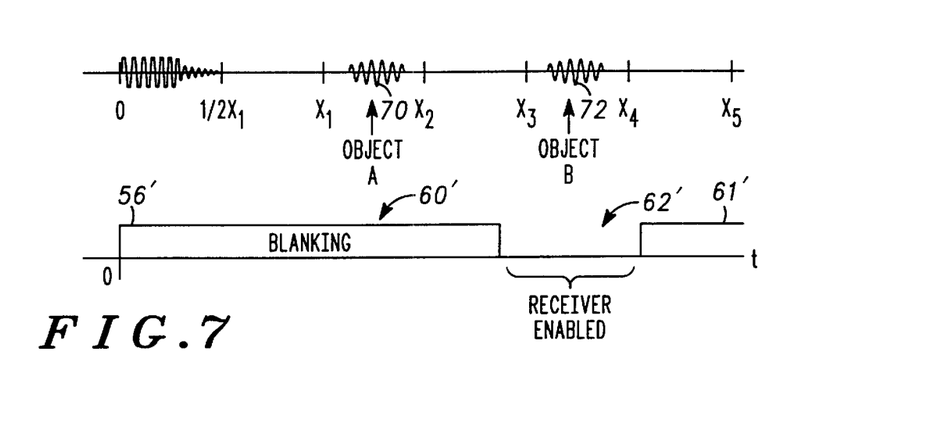
FIG. 7 is a waveform diagram illustrating object detection in accordance with a preferred embodiment of the present invention.

With reference to the method 100 illustrated in FIG. 4 and the waveforms illustrated in FIGS. 5–7, the method 100 begins at step 102 and at step 104, the processor 22 directs the sensor 20 to illuminate, i.e., "ping" the sub-field 42 with a sensing energy emission 54 (FIG. 5). The sensing energy emission 54 is formed by $N_1$ pings of $A_1$ peak-to-peak (p-p) amplitude, 50 percent duty cycle. For example, the sensing energy emission 54 may include 10 pings of 50 volts (V) p-p. Following the emission 54 is a ringout time period $R_1$. Also illustrated in FIG. 5 is the operation of the sensor 20 as a receiver. While the energy emission 54 is generated and during the ringout period, the processor 22 disables the sensor 20 as a receiver. This "blanking" period 60 is illustrated by the receiver disable signal 56. While in the preferred embodiments of the invention the receiver is not actually disabled during this "blanking" period, the processor 22 essentially disregards any receiver output signals from the sensor 20. For convenience and for purposes of illustrating the present invention, however, the period during which the receiver output is disregarded is referred to as the "blanking" period and is illustrated in the figures as blanking pulse or disable signal, e.g., signal 56 and signal 61. From a time and distance viewpoint, as illustrated in FIG. 5, the blanking period 60 corresponds to a distance of approximately ½$X_1$, or half the length of the sub-field 42, although it will be appreciated that this distance may vary based upon a number of considerations, such as, the magnitude of the energy emission from the sensor.

At step 106, and following the blanking period 60, the processor 22 enables the sensor 20 as a receiver during a receiver window 62, and a check is made to determine if there is an object present in the sub-field 42. An object located within the sub-field 42 will cause an energy return. A primary energy return 58 or echo is shown in FIG. 5. The primary energy return 58 is a portion of the energy from the initial energy emission 54 that is reflected by the object back toward the sensor 20. By measuring the time from the energy emission 54 until the primary energy return 58 is detected, the distance of the object from the vehicle may easily be determined. However, by breaking the detection field into sub-fields 42–50 extending from the vehicle 10, merely detecting the object in the sub-field 42 informs the processor 22 that the object is in within a distance of $X_1$ of the vehicle. Detection of the object within the sub-field is accomplished by detecting the object during the receiver period 62 during which the sensor 20 is enabled as a receiver, i.e., the period between the blanking period 56 and blanking period 61 as shown in FIG. 5. As a result, an appropriate alert may be generated, step 108.

Failure to detect a primary energy return 58 does not necessarily lead to the conclusion that an object is not present in the sub-field 42. Referring to FIG. 6, an object may be located at a distance "Q" from the sensor 20, where Q is less than ½$X_1$. As a result, the primary energy return 58 from the object encounters the sensor 20 during the blanking period 56. As a result, the primary energy return 58 is undetected. However, in accordance with the invention, sensor 20 listens for a secondary energy return 66, step 106. The primary energy return 56 encounters the surface 18 of the vehicle, which causes a portion of the primary energy return 58 to be reflected back toward the object 26. This reflected portion is further reflected from the object creating the secondary energy return 66. It is not necessary to distinguish the primary energy return 56 from the secondary energy return 66, because the information provided to the system is simply that an object is within $X_1$ of the vehicle. This information can then be used to provide an alert. Thus, detecting the secondary energy return 66 during the receiver period 62 provides an indicator that an object is within at least $X_1$ of the vehicle 10, and potentially within at least ½$X_1$ of the vehicle 10.

From the foregoing discussion, it will be appreciated that for the first sub-field 42 adjacent the vehicle 10, the distance corresponding to the ringout period should be approximately ½ the length of the sub-field. This allows for the detection of objects lying within the sub-field and substantially closer to the vehicle than would otherwise be possible by detecting either a primary energy return 58 or a secondary energy return 66.

At step 110, the processor 22 causes the sensor 20 to illuminate the sub-field 44. The amount of energy used to illuminate the sub-field 44 is different, and most likely greater, than the amount of energy used to illuminate the sub-field 42. Following a blanking period, the processor 20 enables the sensor 20 as a receiver. If an energy return is detected, step 112, then an appropriate alert is generated, step 108. This process is repeated for each sub-field 42–50, steps 114–120. With the sub-fields displaced at least one sub-field from the vehicle 10, secondary echo's are not of concern for the detection of objects because these sub-fields are displaced such that an object will not be located near enough to the vehicle to generate an energy return that is within the ringout distance from the sensor 20.

Referring to FIG. 7, still more energy is used to illuminate sub-field 50, which is farther from the vehicle, than to illuminate sub-fields 42–48, which are nearer to the vehicle 10. For example, to illuminate sub-field 50, the sensor 20 may generate a waveform having 10 pings at 120 V p-p. The higher level of energy used to illuminate the sub-field 50, however, is also likely to result in the ground being illuminated. As shown in FIG. 7, the sensor 20 is only enabled as a receiver for a specific receiver period 62' between a blanking period 60' and a blanking period 61', during which an energy return 72 from an object located within the sub-field 50 may be detected. Thus, energy returns as a result of the ground being illuminated will not be detected. Likewise, however, energy returns as a result of an object, such as energy return 70, being within the sub-field 44 will also not be detected because the energy return is within the blanking period 60'. However, the object would be detected when the sub-field 44 is illuminated for object detection, and therefore, failing to detect the object during illumination of sub-field 50 is not of concern. Thus, by selectively enabling the sensor 20 as a receiver, it is possible to substantially eliminate detection of energy returns as a result of the ground becoming illuminated. Even still, it is possible for some sub-fields that the ground may become illuminated and generate an undesirable energy return. In addition, other sources of noise, e.g., false echos, may degrade system performance.

Figure 8:
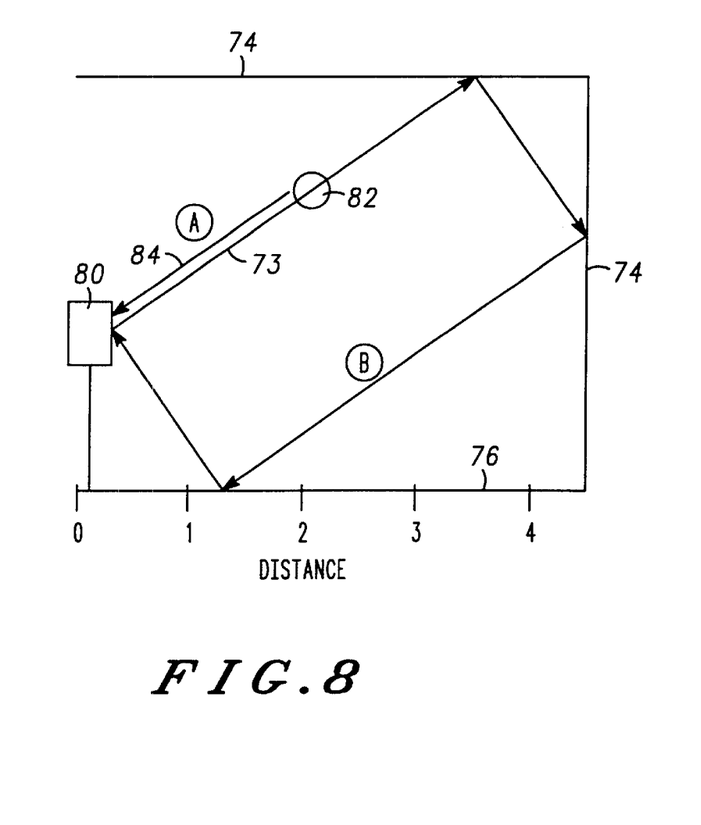
FIG. 8 is a diagram illustrating multipath wave propagation in an object detection system.

False echos, i.e., energy returns that are not representative of an object, can be the result of multipath or from other spurious noise sources. A multipath echo exists when the energy emission is bounced off of more than one object before returning to the sensor. This is illustrated in FIG. 8. Referring to FIG. 8, the energy emission 73, is reflected from a first wall 74, a second wall 76 and a third wall 78 before returning to the source 80. At the same time, the energy emission 73 encounters an object 82 generating an energy return 84. If after a certain time/distance the system did not detect an object, a second energy emission may be initiated. Under certain conditions, following generation of the second energy emission, energy remaining in the detection field, as a result of the multipath, may create a false object detection or false echo.

Figure 9:
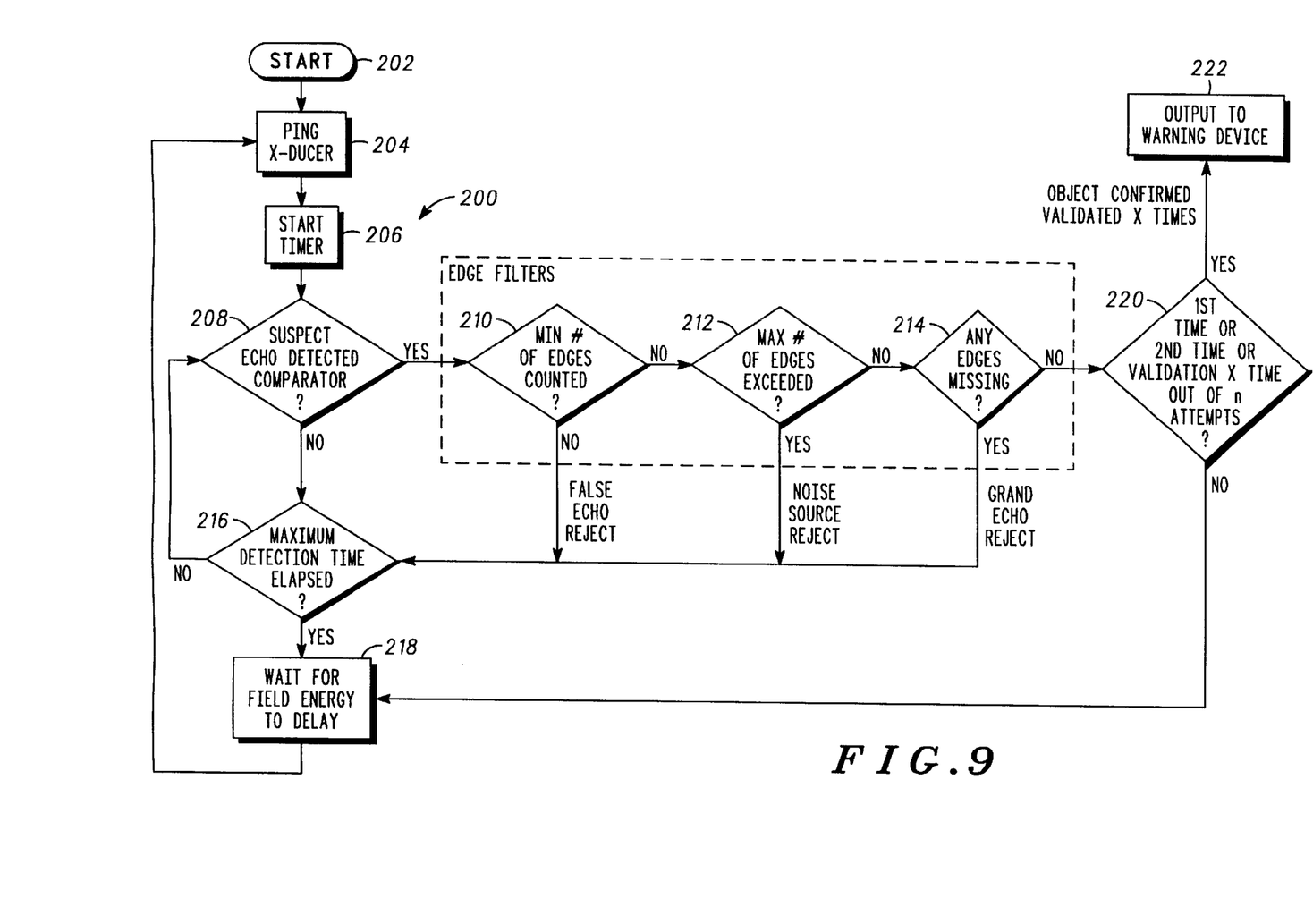
FIG. 9 is a flowchart illustrating a method for verifying object detection in accordance with a preferred embodiment of the invention.

Under ideal conditions, the waveform of the energy return will "look" like the waveform of the energy emission. That is, if the energy emission consisted of 10 pulses, the energy return should have 10 distinct, detectable pulses. With reference to FIG. 9, a method 200 for filtering the energy returns to eliminate false object detections and/or noise is shown.

The method starts at step 202, and at step 204, an energy emission is generated from the sensor 20. At step 206, a timer is initiated. The timer is utilized to define the receiver window as well as the associated blanking periods. That is, the timer sets the period during which the sensor 20 is enabled to detect energy returns. An energy return is detected, and at step 208, a comparator is used to help determine suspect energy returns, i.e., energy returns that may be false objects, multipath and/or noise. False echos and multipath will typically be weaker than a primary energy return. In this case, if the energy return is relatively weak, the energy return may be suspected as being a false return.

If the energy return is suspect, at step 210, the number of edges of the suspect energy return, i.e., the number of pulses in the energy return, is counted. Again, the energy return should look like the original energy emission and contain very nearly the same number of pulses. If a minimum number of pulses is not detected, the suspect energy return is rejected as false.

At step 212, if there are too many edges, i.e., too many pulses in the energy return, the energy return is rejected as being a noise source. The energy emission is generated with a preset number of pulses. Noise sources, however, will typically generate many pulses, and may produce them substantially continuously. Thus, if there are too many pulse in the energy return, it is likely from a noise source and the suspect energy return is rejected.

At step 214, the edges of the counted pulses are evaluated. Energy returns from the ground typically have very erratic pulses. Thus, if pulses are missing from the energy return, it is likely the energy return is from the ground and not an object.

If an energy return is rejected at any of steps 210, 212 and 214, an evaluation is made to determine whether the receiver window has closed, e.g., the timer is referenced, step 216. If the receiver window is still open, the evaluation process is repeated beginning with step 208. If the receiver window has closed, there is a further delay to allow the energy emitted into the detection field to decay, step 218, and the process repeats from step 204.

If a received energy return is not rejected at any of steps 210, 212 or 214, a verification process is initiated at step 220. The detection cycle, namely generating the energy emission and receiving energy returns is repeated in order to provide verification of the object. If the energy return was from an object within the sub-field, then another substantially similar energy return corresponding to the presence of the object should be identified. If a corresponding energy return is identified at least "x" times out of "n" tries, indicating the presence of an object, an alert, if necessary, is generated, step 222. However, if after "n" tries to validate the object, the validation is not successful at least "x" times, it is concluded the energy return was not due to an object, delay step 218 is repeated, and the process repeats from step 204.

Figure 10:
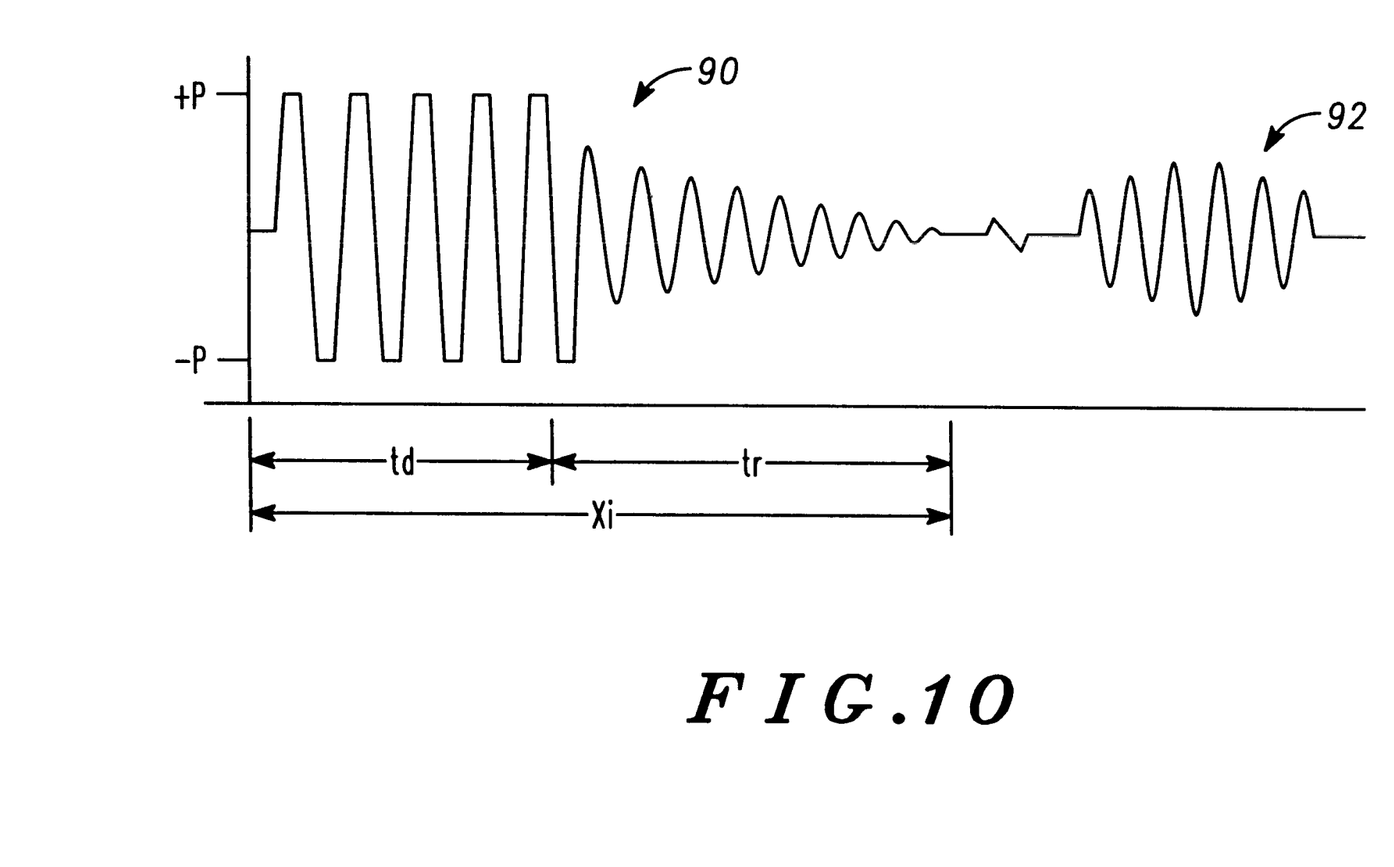
FIG. 10 is a waveform diagram illustrating th e reduction of ringout in accordance with a preferred embodiment of the invention.

Even with the above-described ability of the invention to detect objects during the ringout period, under certain conditions, and particularly near object detection, it is still desirable to reduce the ringout period to as short a time as possible. It is not always possible to reduce the ringout time since, for far object detection it is necessary to emit a sufficient amount of energy to ensure detection of the far object. However, when detecting objects within the sub-field 42 adjacent the vehicle, it is possible to reduce the ringout period. For example, as mentioned above, both the number of pulses and amplitude of the pulses may be reduced. This effectively lowers the energy emission, and correspondingly reduces the ringout time. Additionally, the duty cycle may be altered. A 50% duty cycle was described above. It may be possible to use duty cycles as low as approximately 16% on, 84% off to still further limit the energy. Referring to FIG. 10, a representative waveform 90 is shown. By reducing the number of pulses used to emit the energy, the drive time, $t_d$, may be directly reduced. Reducing the energy, by a combination of reducing the number of pulses, reducing the p-p amplitude of the pulses and reducing the duty cycle of the pulses, reduces the ringing period, $t_r$. The ringout period is the sum of the drive time, $t_d$, and the ringing period, $t_r$, which may, as described above, be correlated to a distance, $X_i$. Reducing the corresponding distance Xi associated with the energy emission and ringout allows for detection of an energy emission 92 from an object at distances nearer to the vehicle 10.

Still other modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the intention, and the exclusive use of all modifications which come within the scope of the appended claims is reserved.

We claim:

1. A method of detecting objects within a detection field, the detection field extending in one direction above a ground plane and from a surface of a motor vehicle, the method comprising the steps of:

dividing the detection field of one sensor into a first sub-field in the one direction and a second sub-field in the one direction;

illuminating the first sub-field with a first energy emission for at least a first receiver enable period;

disregarding the first sub-field from the first energy emission during a first receiver blanking period;

receiving during the first receiver enable period, an energy return as a result of the first energy emission;

determining a presence of an object in the first sub-field;

illuminating the second sub-field with a second energy emission different than the first energy emission for a second receiver enable period;

disregarding the second sub-field from the second energy emission during a second receiver blanking period;

receiving during the second receiver enable period, an energy return as a result of the second energy emission; and determining a presence of an object in the second sub-field.

2. The method of claim 1, wherein each of the first energy emission and the second energy emission comprises ultrasonic energy.

3. The method of claim 1, wherein the first energy emission comprises a first plurality of energy pulses having a first amplitude at a first duty cycle and the second energy emission comprises a second plurality of energy pulses having a second amplitude at a second duty cycle.

4. The method of claim 3, wherein the first plurality of energy pulses is different in number than the second plurality of energy pulses.

5. The method of claim 3, wherein the first amplitude is different in magnitude than the second amplitude.

6. The method of claim 1, wherein the step of determining a presence of an object in the first sub-field comprises, detecting either a primary energy return or a secondary energy return.

7. The method of claim 1, wherein each step of determining a presence of an object comprises verifying the presence of the object.

8. The method of claim 7, wherein the step of verifying the presence of the object comprises characterizing at least one of the first energy return and the second energy return.

9. The method of claim 8, wherein the step of characterizing comprises evaluating a number of pulse edges in the one of the first energy return and the second energy return.

10. The method of claim 8, wherein the step of characterizing comprise measuring a magnitude of each of the first energy return and the second energy return.

11. The method of claim 10, wherein the step of characterizing further comprises rejecting at least one of the first energy return and the second energy return when the respective magnitude of the first energy return an the second energy return is less than an a respective expected magnitude value for the first energy return and the second energy return.

12. The method of claim 1, further comprising the step of delaying for a predetermined time period between the steps of illuminating the first sub-field and the step of illuminating the second sub-field.

13. The method of claim 1, wherein the first sub-field is adjacent the surface of the vehicle.

14. The method of claim 1, wherein the second sub-field is adjacent the surface of the vehicle.

15. The method of claim 1, wherein the first sub-field extends a first distance from the surface of the vehicle and the second sub-field extends a second distance from the surface of the vehicle.

16. The method of claim 1, further comprising the step of generating an alert responsive to determining the presence of an object in the first sub-field or the presence of an object in the second sub-field.

17. The method of claim 1, wherein the surface of the vehicle comprises one of a front surface of the vehicle and a rear surface of the vehicle.

18. The method of claim 1, wherein the first receiver blanking period and the second receiver blanking period precede respectively the first and second receiver enable periods.

* * * * *